United States Patent
Carman et al.

(10) Patent No.: US 11,157,235 B2
(45) Date of Patent: Oct. 26, 2021

(54) SYSTEM AND METHOD FOR VERYIFYING AUDIBLE AND/OR VISUAL NOTIFICATIONS

(71) Applicant: Aptiv Technologies Limited, St. Michael (BB)

(72) Inventors: Dan D. Carman, Russiaville, IN (US); Kirk A. Bailey, Westfield, IN (US); Douglas A. Srail, Kokomo, IN (US); Kevin W. Kaster, Kokomo, IN (US)

(73) Assignee: APTIV TECHNOLOGIES LIMITED

( * ) Notice: Subject to any disclaimer, the term of this patent is extended or adjusted under 35 U.S.C. 154(b) by 0 days.

(21) Appl. No.: 16/814,200

(22) Filed: Mar. 10, 2020

(65) Prior Publication Data

US 2021/0286585 A1  Sep. 16, 2021

(51) Int. Cl.
  *G06F 3/16* (2006.01)
  *G10L 25/84* (2013.01)
  *G10L 25/51* (2013.01)

(52) U.S. Cl.
  CPC .............. *G06F 3/165* (2013.01); *G10L 25/51* (2013.01); *G10L 25/84* (2013.01)

(58) Field of Classification Search
  CPC combination set(s) only.
  See application file for complete search history.

(56) References Cited

U.S. PATENT DOCUMENTS

| | | | |
|---|---|---|---|
| 4,352,088 A | 9/1982 | Tsunoda | |
| 6,859,144 B2 | 2/2005 | Newman et al. | |
| 8,412,413 B1 | 4/2013 | Stark et al. | |
| 9,508,344 B2 | 11/2016 | Srail | |
| 9,958,318 B2 | 5/2018 | Staudenmaier et al. | |
| 2010/0158275 A1* | 6/2010 | Zhang | H03G 3/32 381/107 |
| 2013/0259283 A1* | 10/2013 | Gengler | H04R 1/00 381/334 |
| 2013/0293371 A1* | 11/2013 | Patel | B60C 23/0455 340/442 |
| 2015/0382128 A1* | 12/2015 | Ridihalgh | H04R 29/008 381/57 |
| 2016/0034416 A1* | 2/2016 | Chavez | G06F 13/4282 381/59 |
| 2016/0343241 A1* | 11/2016 | Rossi | G08B 29/126 |
| 2017/0125026 A1* | 5/2017 | Lawrence | H04J 3/0632 |
| 2018/0103318 A1* | 4/2018 | Amman | H04R 3/02 |

(Continued)

*Primary Examiner* — Duc Nguyen
*Assistant Examiner* — Assad Mohammed
(74) *Attorney, Agent, or Firm* — Billion & Armitage

(57) ABSTRACT

A method of verifying audio notifications generated within a vehicle includes generating an audio notification using an audio generation path that includes at least a controller, an audio notification generator and a speaker, wherein the controller generates an audio notification request utilized by the audio notification generator to generate an audio signal, and wherein the speaker converts the audio signal into the audio notification. The method further includes monitoring sounds within the vehicle using a microphone separate from the audio generation path and analyzing the monitored sounds using an audio analyzer, wherein the audio analyzer verifies whether the audio notification was generated. Feedback is provided to the audio generation path regarding whether generation of the audio notification was verified.

18 Claims, 6 Drawing Sheets

(56) References Cited

U.S. PATENT DOCUMENTS

2019/0172457 A1* 6/2019 Cheng .................. G10L 15/08
2020/0004244 A1   1/2020 Mangal et al.
2020/0198652 A1* 6/2020 Deshpande ....... B60W 30/0956
2020/0294092 A1* 9/2020 Tong .................... G01C 21/36

* cited by examiner

SYSTEM AND METHOD FOR VERYIFYING AUDIBLE AND/OR VISUAL NOTIFICATIONS

FIELD

This disclosure is generally directed to audible and/or visual notifications utilized in automobiles and, more specifically to systems, devices and methods for verifying generation and/or delivery of these notifications.

BACKGROUND

Vehicles utilize a variety of audible and/or visual notifications to communicate information to the operator of a vehicle. In some cases, a plurality of different components and/or systems may be utilized to generate the audible and/or visual notification. A fault in any one of the components/systems included in the notification generation path may result in a failure to generate the notification. In some cases, the systems utilize a plurality of internal checks to ensure components within the notification generation path are operating correctly. However, the desired result is that the operator becomes aware of the condition communicated by the audible and/or visual notification, and the internal checks do not verify whether the operator received the communication. It would be desirable to remedy these deficiencies.

SUMMARY

According to one aspect, a method of verifying audio notifications generated within a vehicle is provided. The method may include generating an audio notification using an audio generation path, wherein the audio generation path includes at least a controller, an audio notification generator and a speaker. The controller generates an audio notification request utilized by the audio notification generator to generate an audio signal, and the speaker converts the audio signal into the audio notification. The method further includes monitoring sounds within the vehicle using a microphone separate from the audio generation path and analyzing the monitored sounds using an audio analyzer, wherein the audio analyzer verifies whether the audio notification was generated. Feedback is provided to the audio generation path regarding whether generation of the audio notification was verified.

According to another aspect, an audio notification system for use in vehicles is provided. The audio notification system include an audio notification generation path that further includes at least a controller, an audio notification generator, and a speaker, wherein the controller generates a audio notification request, the audio generator generates an audio notification signal in response to the audio notification request, and the speaker converts the audio notification signal into an audio output provided as an audio notification to an operator of the vehicle. In addition, the audio notification system may include an external audio verification system that includes at least a microphone and an audio analyzer, wherein the microphone monitors audio signals within an interior cabin of the vehicle and the audio analyzer analyzes monitored audio signals to verify whether the audio notification requested by the controller was properly generated. Verification is provided as feedback to the audio notification generation path.

According to another aspect, a method of verifying audio notifications generated within a vehicle is provided. The method includes receiving feedback from an external audio monitoring system that includes a microphone and an audio signal analyzer regarding ambient sound levels measured within an interior cabin of a vehicle. The method further includes generating an audio notification using an audio generation path that includes at least a controller, an audio notification generator, an amplifier and a speaker, wherein the controller generates an audio notification request utilized by the audio notification generator to generate an audio notification signal based on the ambient sound levels measured by the external audio monitoring system, and wherein the speaker converts the audio notification signal into the audio notification. Sounds are monitored within the vehicle using a microphone separate from the audio generation path and the monitored sounds are analyzed using an audio analyzer, wherein the audio analyzer verifies whether the audio notification was generated. Feedback is provided to the audio generation path regarding whether generation of the audio notification has been verified.

DETAILED DESCRIPTION

A typical vehicle communicates information to an operator of the vehicle utilizing a variety of audio and visual notifications. For example, an audio notification (e.g., chime) may be generated in response to an object detected behind the vehicle while in reverse. A plurality of components are required to generate the desired audio notification, from the sensors utilized to detect the object, to the controller responsible for receiving the alert and generating the notification request, to the amplifiers and speakers utilized to generate the audio notification. A failure at any point along the generation path may result in a failure to generate the audio notification. In addition, in some cases the audio notification (or visual notification) may be generated but may not be received by the operator due to factors external to the notification generation path such as excessive cabin noise or obscured visual display.

According to some aspects, this disclosure is directed to an external verification system for monitoring audio and/or visual notifications to ensure notifications are generated and/or received by the operator. Unlike many fault detection systems, the external verification path monitors the output of the notification path—the actual audio notification and/or visual notification—using one or more microphones and/or cameras. Hence, the verification system is external to the audio/visual notification generation path. For example, in some embodiments the external verification system is comprised of one or more microphones and an audio analyzer (e.g., digital signal processor) configured to monitor sounds generated within the cabin and provide feedback verifying proper generation of the audio notification. In some embodiments the feedback includes only verification of whether the audio notification was detected. In other embodiments, other parameters may be monitored such as volume of the audio notification, the signal-to-noise ratio (SNR) of the audio notification relative to ambient noise within the cabin, and/or other parameters to determine whether the audio notification was likely audible to the operator. In other embodiments, the external verification system is comprised of one or more cameras and a visual analyzer (e.g., digital signal processor) configured to monitor visual indicators displayed to an operator and/or visual responses of an operator to verify the generation of visual indicators. In some embodiments, the feedback may additionally include parameters associated with the visual notification that can be utilized to determine whether a visual notification was received by the operator.

Figure 1:
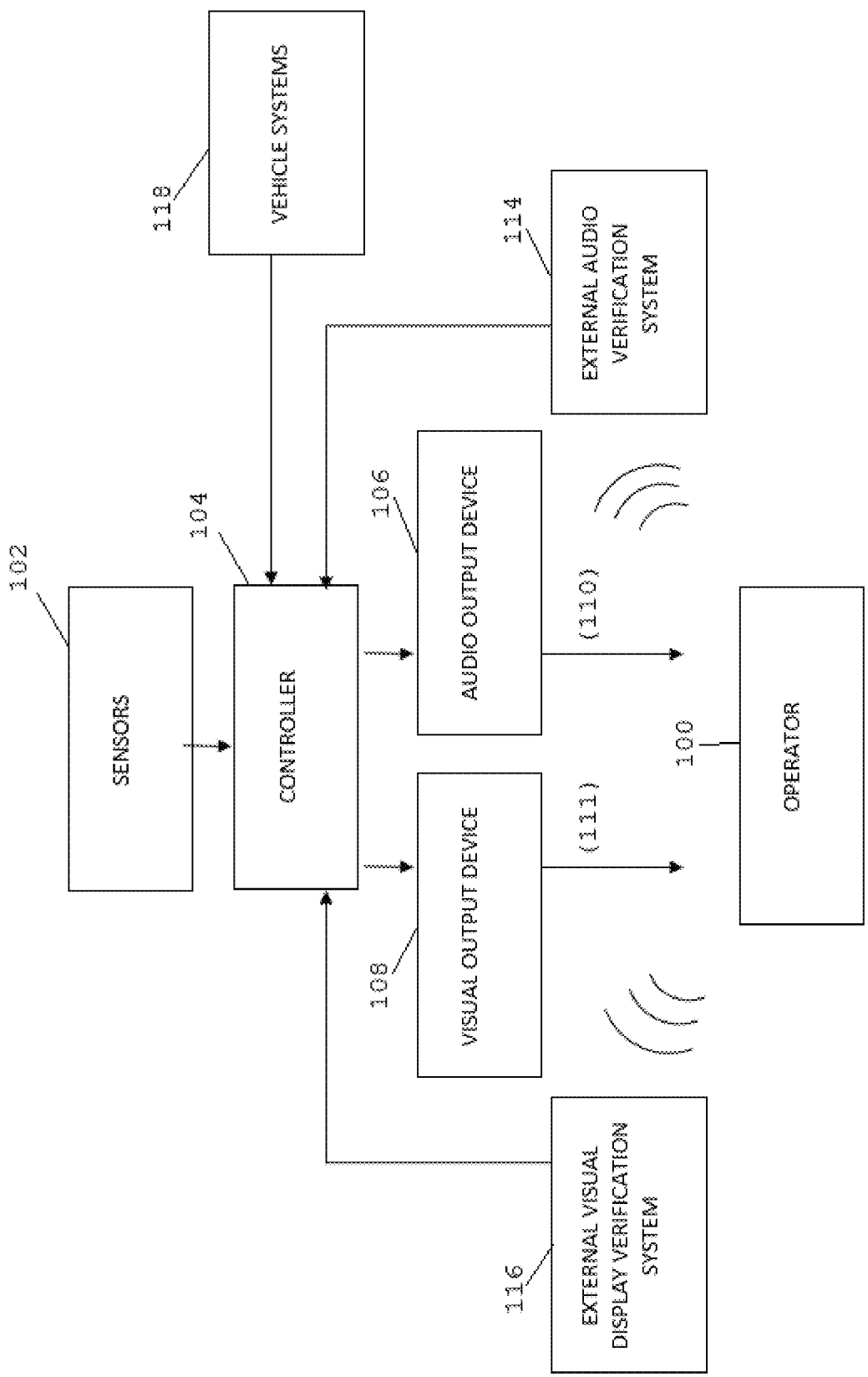
FIG. 1 is a block diagram illustrating generation and monitoring of audio and/or visual notifications according to some embodiments.

FIG. 1 is a block diagram illustrating components utilized to generate an audio and/or visual notification for display to an operator 100. In the embodiment shown in FIG. 1, these components include one or more sensors 102, a controller 104, an audio output device 106 and/or visual output device 108. For example, the sensors 102 may include a variety of different types of sensors located at various locations within and outside of the vehicle. These may include proximity, radar, LiDAR detectors, seat belt detectors, passenger detection sensors, temperature sensors, maintenance schedule signals, low oil sensors, gas tank sensors, and others. Controller 104 generates notification requests in response to the data provided by the one or more sensors 102. This may include audio and/or visual notifications, wherein the audio output device 106 generates audio notifications and the visual output device 108 generates visual notifications. Collectively, these components comprise the notification generation path and are utilized to generate an audio and/or visual notification provided to the operator 100. It should be understood that the notification generation path may include a number of additional components/systems, some of which are shown in more detail in FIGS. 2 and 5, below. The output of the notification generation path is either an audio notification 110 and/or a visual notification signal 111. For example, if the notification signal is an audio signal 110 it may be in the form of a simple tone, a complex tone, music or parts of music, a voice recording, or any other sound or mixture of the mentioned sounds that can be used to convey information to the operator. If the output of the notification generation path is a visual notification signal 111 it may be in the form of a visual display. The visual display may be generated in a plurality of locations, including one or more of the dash display, a heads-up display on a dedicated display or projected on the windshield, as indicator lights as part of or separate from the main dash display, as indicator lights or visual displays at other locations such as the steering wheel, center console, front pillar, overhead console, or center seat console.

An external verification system monitors the audio and/or visual outputs 110, 111, respectively generated by the audio output device 106 and/or visual output device 108 and provides feedback to verify delivery of the audio and/or visual outputs. In some embodiments the external verification system includes an external audio verification system 114 comprised of one or more microphones configured to monitor sounds within the cabin. The external verification system 114 provides feedback to the audio notification generation path verifying generation of the audio notification. In some embodiments, the independent monitoring system includes a visual monitoring system 116 comprised of one or more cameras configured to monitor visual displays within the vehicle and provide feedback to the notification generation path verifying generation of the visual notification. In some embodiments, the independent monitoring system is comprised of both an audio monitoring system 114 and a visual monitoring system 116. It is important to note that the audio monitoring system 114 and/or visual monitoring system 116 are not a part of the notification generation path 108. Both the audio monitoring system 114 and visual monitoring system 116 are configured to passively monitor the output (audio and/or visual) of the notification generation paths. Hence, the monitoring systems are external and independent of the notification generation paths. A benefit of this approach is that typical verification and/or fault detection systems monitor at a point along the generation path, wherein faults located downstream of the point monitored go undetected.

Feedback provided to the notification generation path (e.g., controller 104) may include one or more of verification that the audio/visual signal was generated, as well as additional parameters associated with the audio/visual signal (e.g., SNR, decibel level, brightness, etc.) utilized to assess the likelihood that the notification was received by the operator. In other embodiments, the external/independent monitoring system is configured to monitor the response of the operator to determine whether the audio and/or visual notification was received. For example, in some embodiments the visual monitoring system 116 is configured to monitor eye movements of the operator to detect whether the operator looks at the visual display and/or reacts to the audio notification. In other embodiments, the audio monitoring system 114 is configured to monitor auditory responses from the operator acknowledging receipt of the audio and/or visual notification.

In some embodiments, in addition to feedback provided by the external monitoring systems, input received from vehicle systems (e.g., braking system, steering system) can be utilized to complement feedback received from the external verification systems to determine whether an operator received a notification. For example, an audio notification indicating an object located behind a vehicle moving in reverse was likely not audible to the operator if the brakes are not engaged.

In response to the received feedback, controller 104 may modify one or more parameters of the audio and/or visual notification and cause the notification to be generated again. In other embodiments, the controller 104 may utilize an alternative generation path. For example, a failed audio notification may be delivered to the operator using the visual notification generation path, or vice versa.

Figure 2:
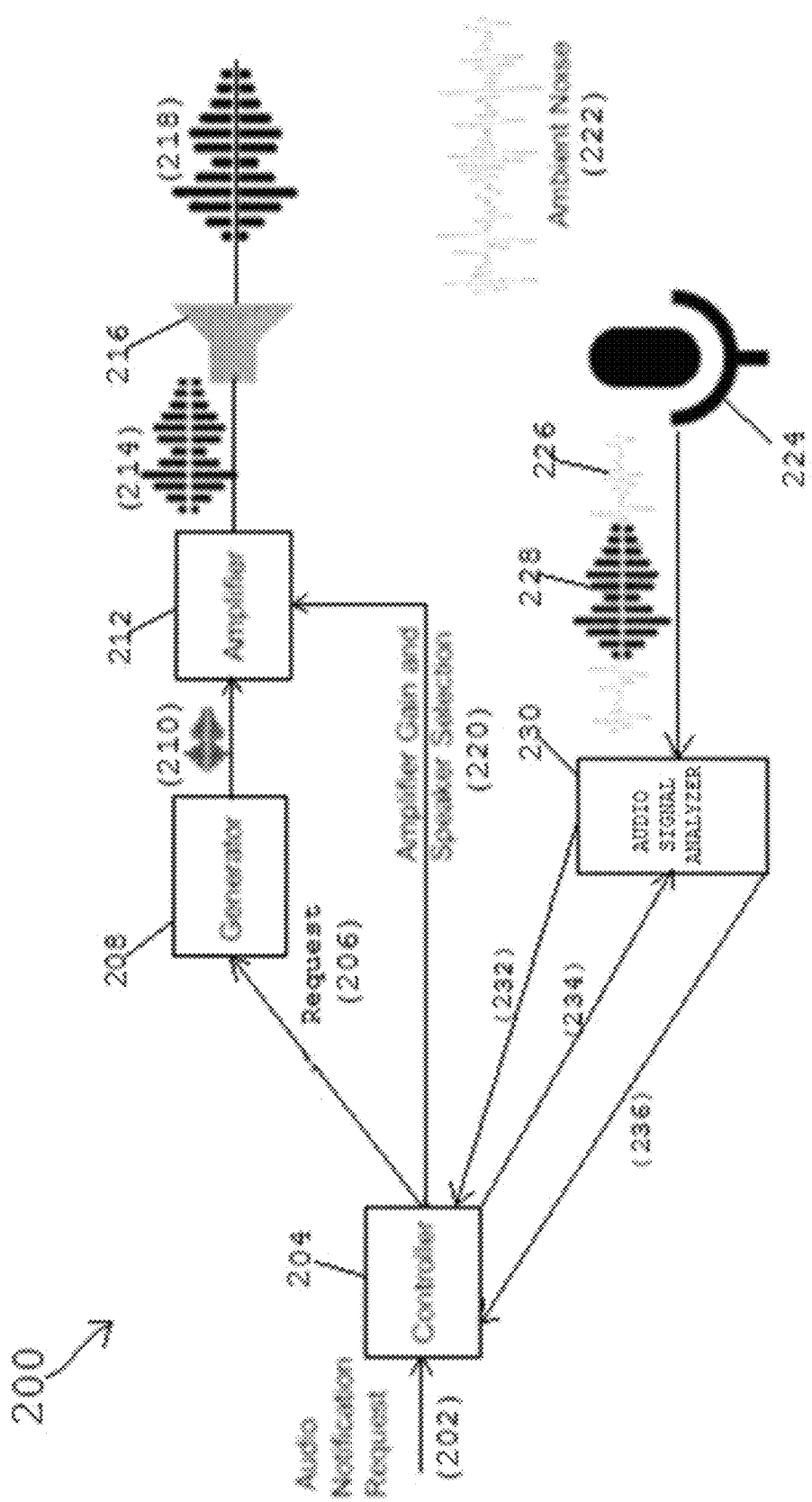
FIG. 2 is a block diagram illustrating generation and monitoring of audio notifications according to some embodiments.

FIG. 2 is a block diagram illustrating generation and monitoring of audio notifications according to some embodiments. In the embodiment shown in FIG. 2, the audio verification system includes controller 204, audio notification generator 208, amplifier 212, speaker 216, microphone 224, and audio signal processor 230. In some embodiments, controller 204, audio notification generator 208, amplifier 212, and speaker 216 form an audio generation path responsible for generating an audio notification 218 in response to an audio notification request 202. In the embodiment shown in FIG. 2, microphone 224 and signal processor 230 form an external audio verification system configured to monitor the audio signals within the interior of the vehicle and to verify the generation of audio notifications 218. In some embodiments, microphone 224 and/or signal processor 230 may provide additional functionality beyond verifying audio notifications 218. For example, microphone 224 and signal processor 230 may be utilized as part of a hands-free voice command system and/or noise cancelling microphones.

In some embodiments, the audio generation path receives a notification request 202 from one or more systems. In response to the notification request 202, controller 204 generates an audio notification request (hereinafter, "request") 206 provided to audio notification generator (hereinafter, "generator") 208. In some embodiments, the request 206 may identify the type of audio notification to be generated. For example, a different type of audio notification may be generated based on the information to be conveyed to the user (e.g., seatbelt notification, blind spot warning, engine warning, etc.). In some embodiments, in addition to providing a request 206 to generator 208, controller 204 provides expected audio notification audio parameters (hereinafter, "parameters") 234 to audio signal processor 230, which utilizes the parameters 234 to monitor—specifically—for the expected audio notification. In response to the request 206, generator 208 generates an audio signal 210. In some embodiments, amplifier 212 amplifies the audio signal 210 and provides the amplified audio signal 214 to speakers 216. In some embodiments, controller 204 provides an input 220 to amplifier 212 to control one or more parameters of the amplified signal 214, including amplifier gain (magnitude of the amplified signal 214) and/or the output speakers 216 that will receive the amplified signal 214. One or more speakers 216 convert the amplified audio signal 214 to an audio notification 218. In some embodiments, speakers 216 are dedicated to providing audio notifications to the operator. In other embodiments, speakers 216 may be multi-purpose, providing audio notifications as well as operating as entertainment speakers/hand-free calling speakers, etc. In some embodiments, a plurality of speakers 216 may be located at different locations throughout the interior of the cab, wherein controller 204 may selectively activate one or more of the speakers to generate the audio notification.

In some embodiments, microphone 224 and audio signal processor 230 comprise the external audio verification system. Microphone 224 detects audio signals within the interior of the cabin and audio signal processor 230 (e.g., digital signal processor (DSP)) analyzes the detected signal to detect the audio notification 218. In some embodiments, microphone 224 is dedicated for use by the external audio verification system. In some embodiments, microphone 224 is positioned so that sounds sensed by the microphone 224 corresponds closely with the sound heard by the operator. For example, microphone 224 may be located in or around the area associated with the operator (e.g., steering wheel, driver side door, driver seat, etc.). In some embodiments the microphone 224 utilized by the external audio verification system is also utilized in other systems, for example hands-free voice command systems and/or Bluetooth voice call systems.

Microphone 224 senses all audio sounds within the interior cabin, including both ambient noise 222 and audio notifications 218. As shown in FIG. 2, the recorded audio signal provided by microphone 224 includes representations of the ambient noise 226 (illustrated in FIG. 2 with a lighter tone) and the recorded audio notification 228 (illustrated in FIG. 2 with a darker tone). Audio signal analyzer 230 receives the sensed audio signal and analyzes it to detect/verify generation of the audio notification 218. Audio signal analyzer 230 operates continuously to detect/verify generation of one or more audio notification. In this embodiment, audio signal analyzer 230 may compare the recorded audio signal to a library of possible audio notifications. In response to detection of one or more of the audio notifications the audio signal analyzer 230 provides verification feedback to controller 204. In some embodiments, verification feedback provided to controller 204 includes identification of the notification detected as well as one or more measured parameters associated with the audio notification. For example, in some embodiments this may include one or more of magnitude of the audio notification, magnitude of the audio notification related to ambient noise (i.e., signal to noise ratio (SNR)), duration of the audible chime, intelligibility, formant, tambre, resonance frequencies, attack, decay, etc.

In other embodiments, rather than continuously analyze sensed audio signals, the audio signal processor 230 analyzes sensed audio signals in response to notification parameters 234 received from the controller 204 indicating an audio notification request. In some embodiments, the parameters 234 indicates the type of audio notification to be generated. In some embodiments, the parameters 234 may include additional information, such as importance level of the audio notification, amplification setting, verification required, etc. In response, audio signal processor 230 monitors sensed audio signals for the requested notification and provides feedback 232 to controller 204 in response to the detected audio notification 218. In some embodiments, audio signal analyzer 230 operates to correlate a known signal (i.e., the requested audio notification) with the unknown input (i.e., the sensed audio signal), wherein the correlation is provided in feedback to controller 204. Based on the correlation, controller 204 verifies the generation of the audio notification 218. Benefits of providing the notification parameters 234 to the audio signal analyzer 230 include discrete versus continuous analysis of the sensed audio signal, which could also help conserve power. In addition, feedback may include an indication that the particular audio notification requested by the controller 204 and provided to audio signal analyzer 230 in the notification parameters 234 was not detected. In contrast, if audio signal analyzer 230 is continuously monitoring the recorded audio signals for one or more audio notifications without knowledge of whether an audio notification has been requested, signal analyzer 230 cannot provide feedback in response to a requested notification not being detected (although controller 204 may be able to acquiesce from the lack of feedback that no audio notification was detected). In some embodiments, audio signal analyzer 230 continuously monitor for audio notifications even if notification requests are provided to the audio signal analyzer 230 prior to signal generation. In some embodiments, this allows for verification of audio notifications despite errors in generating the notification provided to the audio signal analyzer 230.

In addition, feedback 232 provided by audio signal analyzer 230 may include one or more parameters measured with respect to the audio notification, such as amplitude, amplitude relative to ambient noise (e.g., SNR), intelligibility, formant, tambre, resonance frequencies, attack, decay, etc. for the audio notification and/or noise. In some embodiments, despite a requested notification being verified by the external audio verification system, the one or more measured parameters may indicate that the audio notification was not audible to the operator (e.g., amplitude and/or SNR below a threshold level). In this way, even verification that an audio notification was detected may require a second notification request to correct the defects of the first to ensure the audio notification is received/heard by the operator.

In response to feedback received from audio signal analyzer 230, controller 204 may take a variety of different actions. For example, in some embodiments if the feedback 232 verifies generation of the audio notification and measured parameters indicate that the notification was audible to the operator, then no further action may be taken. In some embodiments, if the audio notification was detected by the external audio verification system but measured parameters such as SNR or amplitude indicate that the audio notification 218 was not audible to the operator, then controller 204 may generate a second notification request 206 and modify one or more aspects of the audio generation path such as the amplifier gain input 220 to increase the magnitude of the audio notification 218. In other embodiments, if the audio notification was detected by the external audio verification system but measured parameters such as SNR or amplitude indicated that the audio notification 218 was not audible to the operator, and additional increases in volume or speaker selection are not possible or desired or the notification has a high urgency, then controller 204 may opt to generate the alert in a different format (e.g., visual notification). Finally, in embodiments in which the audio notification is not detected by the external audio verification system then controller 204 may make another request 206 and increase the amplifier gain 220. In some embodiments, if the audio notification 218 is not detected by the external audio verification system and additional increases in volume are not possible or desired or the notification has a high urgency, then the controller 204 may opt to generate the notification in a different format (e.g., visual notification). In addition, because the audio notification was not detected at all, controller 204 may generate an error or alert indicating that the audio generation path—including controller 204, generator 208, amplifier 212, and speaker 216 may be experiencing a fault that requires service. In the event a fault in the audio generation path is detected, controller 204 may direct all subsequent notifications into an alternate notification system (e.g., visual notification).

In some embodiments, in response to audio notification parameters 234 received from controller 204—but prior to generation of the audio notification 218—the external audio verification path may generate an ambient noise level feedback 236 provided to controller 204. In some embodiments, microphone 224 senses ambient noise within the cabin and audio signal analyzer 230 measures the noise level (e.g., amplitude, spectral content, etc.) and provides ambient noise feedback 236 to the controller 204. In response to the ambient noise feedback 236, controller 204 may modify delivery of the notification. In some embodiments, controller 204 may determine due to the ambient noise feedback 236 that an alternative to an audio notification is required, such as a visual notification. In some embodiments, controller 204 may determine due to the ambient noise feedback 236 that the amplitude of the audio notification will be increased via an increase to the amplifier gain 220 provided to amplifier 212.

In some embodiments, the external audio verification system is utilized to detect voice commands from the operator regarding receipt of the audio notification and/or visual notification. For example, in some embodiments, in response to receipt of an audio notification (or visual notification) the operator provides a verbal/audible verification (e.g., operator may answer, "Yes", or "Received") that is detected by the audio signal analyzer 230 and provided in feedback to the controller 204.

Figure 3:
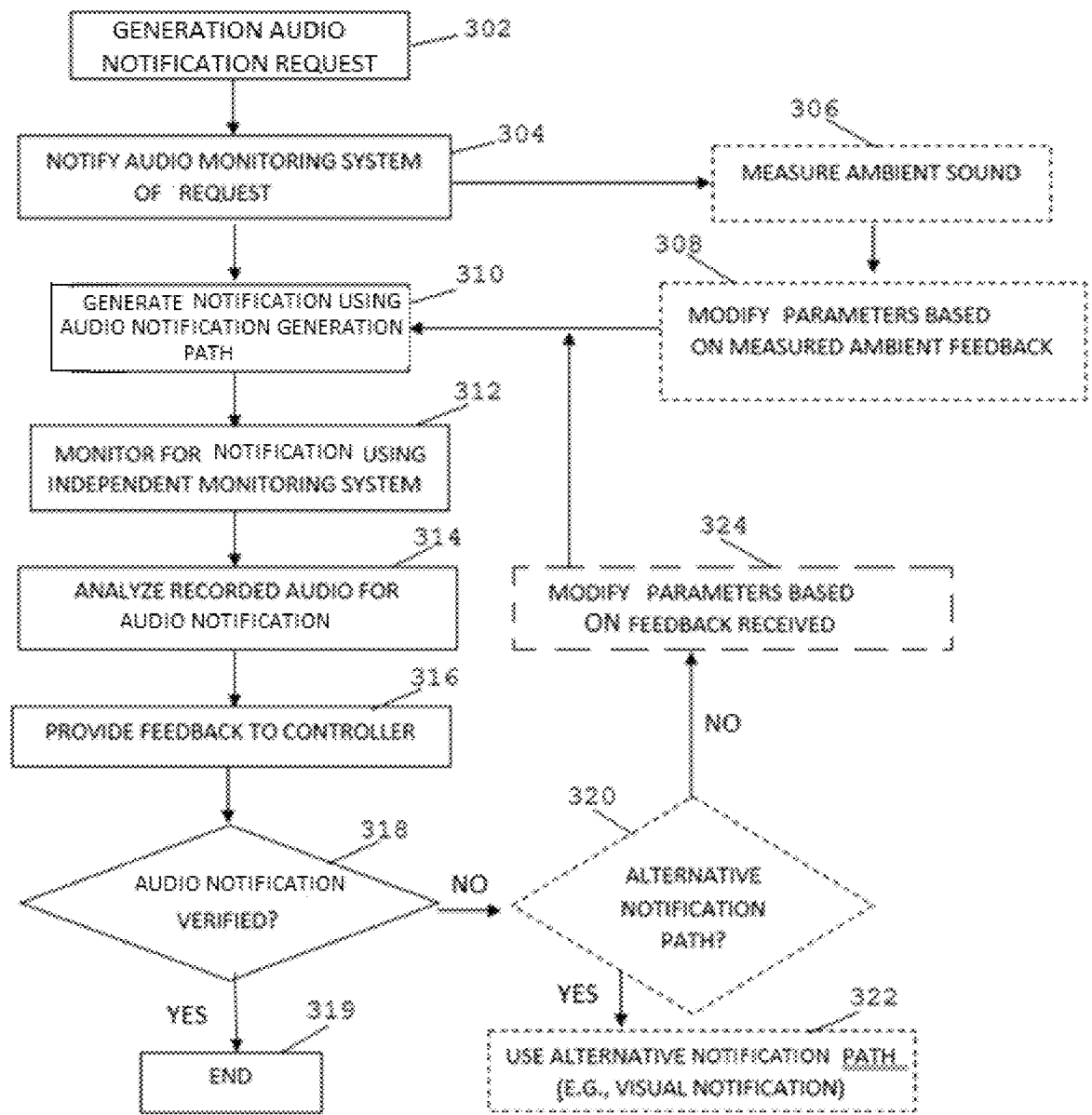
FIG. 3 is a flowchart illustrating verification of audio notifications according to some embodiments.

FIG. 3 is a flowchart illustrating verification of audio notifications according to some embodiment. At least some of the steps included in the flowchart may be optional, as indicated by the dashed lines.

At step 302, an audio notification request is generated. As described in FIG. 2, the request may be generated by controller 204. In some embodiments, at step 304 the independent monitoring system is notified of the request. As described with respect to FIG. 2, controller 204 may provide the external audio verification system (e.g., audio signal analyzer 230) with the audio notification parameters 234. For example, if a particular chime is to be generated, the parameters 234 alerts the external audio verification system of the particular audio notification to be detected. In some embodiments, knowledge of the chime to be detected decreases the processing requirements for analyzing recorded audio signals.

In some embodiments, at step 306 the independent monitoring system (e.g., microphone 224 and audio signal analyzer 230 shown in FIG. 2) senses ambient sound within the cabin and at step 308 provides feedback utilized to modify the notification parameters (e.g., increase amplitude, select speakers, etc.). For example, conditions that may affect the ambient noise level includes windows being down, HVAC fans, outside noise, conversation of passengers within the vehicle, personal audio, etc. In some embodiments, measuring ambient noise levels prior to generation of the audio notification ensures the first notification is generated at an amplitude likely to be audible to the operator. In other embodiments, pre-measuring ambient noise levels and providing the results in feedback to the audio notification generation path (e.g., controller 204 in FIG. 2) is not required, wherein feedback is only provided in response to a generated notification.

At step 310, the audio notification is generated using the generation path, which as discussed in FIG. 2 may include audio notification generator 208, amplifier 212, and speaker 216. In embodiments in which pre-measuring ambient noise is provided at step 306 and 308, then generating the audio notification may include modifying audio parameters (e.g., amplifier gain, speaker selection, etc.) within the chime generation path to ensure the volume level or amplitude of the audio notification is sufficient to be heard by the operator. If pre-measuring ambient noise is not utilized, then audio parameters may be selected based on pre-determined values, previously utilized audio parameters, or selected based on other factors such as the criticality of the notification.

At step 312, the external audio verification system monitors/senses sounds generated within the interior of the cabin. In some embodiments, the microphone utilized to sense sounds located in close proximity to the location of the operator such that the sounds detected by the microphone are representative of the sounds heard by the operator. As discussed above, in some embodiments it is beneficial if the microphone utilized for other systems, such as the microphone utilized for hands-free voice commands/Bluetooth calls, etc. can be utilized to monitor sound within the interior of the cabin. In particular, because hands-free voice command and/or Bluetooth microphones for voice calls are placed in close proximity to the operator, these devices will also be well-positioned to monitor/verify whether audio notifications are detectable to the operator.

At step 314, audio detected and/or recorded at step 312 (e.g., by microphone 224) is analyzed to verify generation of the expected audio notification. In some embodiments, an audio correlation function is utilized to compare the recorded audio with the expected notification, wherein the result of the correlation function provides an indication of whether the audio notification was generated. In some embodiments, in addition to verification of audio notification generation, one or more parameters associated with the audio notification are measured (e.g., signal-to-noise ratio (SNR), amplitude of measured signal, etc.).

At step 316, feedback is provided to the generation path (e.g., controller 204 shown in FIG. 2). In some embodiments, feedback includes verification the audio notification was generated. In other embodiments, feedback includes measured parameters associated with the audio notification including SNR and/or amplitude of the measured signal.

At step 318 a determination is made whether the audio notification satisfied notification requirements. For example, in some embodiments if the audio notification was verified, then the requirement has been satisfied and the process ends at step 319. In other embodiments, the determination at step 318 determines whether the audio notification provided sufficient notification to the operator. In some embodiments, this determination may rely on whether one or more of the measured parameters (e.g., amplitude, SNR) of the detected audio notification satisfies a threshold value. In the event that the audio notification is not detected, or one or more of the measured parameters (e.g., amplitude, SNR) does not satisfy a threshold value, then at step 320 a determination is made whether the notification should be provided via an alternative notification path (e.g., visual notification). For example, if the generation path is already operating at a maximum volume (e.g., maximum amplification), then at step 322 the notification is provided via an alternative path (e.g., visual notification). A benefit of this approach is that the notification is not confined to a single generation path and may be modified during operation to overcome conditions outside of the control of the initial generation path. For example, audio notifications—even in an audio generation path that is working properly—may not be heard in the event the windows are down. In this embodiment, an alternative notification path may be utilized to deliver the notification (e.g., a visual notification).

If an alternative notification path is not utilized at step 320 then at step 324 the parameters associated with the audio notification are modified based on the received feedback and a new audio notification is generated at step 310. For example, in some embodiments this may include modifying the amplification of the audio notification and/or speakers utilized to generate the chime, or even generate a different type of chime designed to get the operator's attention. Based on the new parameters, at step 310 the new audio notification is generated and the process continues until the generated notification satisfies the external audio verification system and/or an alternative notification path is utilized. In other embodiments, additional inputs may be provided by other systems, such as an external visual notification verification system utilized to monitor operator reactions (e.g., eye movement, gaze tracking) in response to an audio notification to detect receipt by the operator and/or inputs from other vehicle systems (e.g., braking system activated in response to rear object alert while backing up). In this way, external systems (i.e., external to the notification generation path) may be utilized to verify generation and receipt of audio notifications or chimes.

Figure 4:
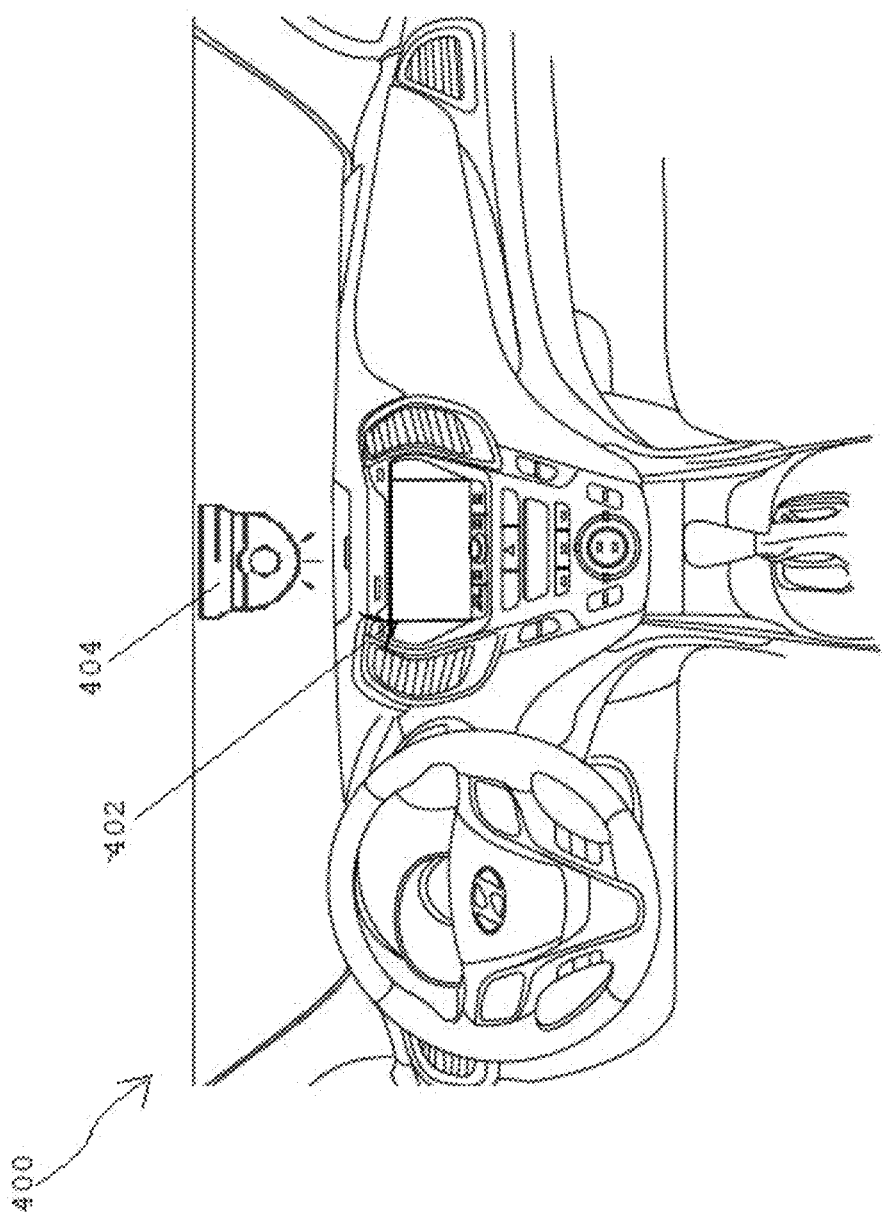
FIG. 4 is an interior view of a vehicle cabin having an external visual notification verification system according to some embodiments.

FIG. 4 is a forward-facing view of an interior 400 of a vehicle that includes a display 402 and camera 404. As described in more detail with respect to FIGS. 5 and 6 below, a visual notification generation path includes a plurality of components configured to generate visual notifications in one or more locations, such as display 402. In some embodiments, the camera 404 is part of an external visual notification verification system configured to monitor one or more of the display 402 and/or the operator (not shown) of the vehicle in order to verify generation of a visual notification and/or receipt of the visual notification by the operator. For example, in some embodiments, the camera 404 captures images/videos of the display 402 and provides feedback to the visual notification generation path verifying whether the visual notification was displayed properly. In some embodiments, verification may also include analyzing the captured images/video to derive one or more parameters associated with the visual notification (e.g., brightness, contrast, missing pixels, etc.) associated with the displayed visual notification. In some embodiments, camera 404 captures images/video of the operator and provides feedback to the visual notification generation path verifying that the operator noticed the visual notification. In some embodiments, this may include analyzing eye movements/gaze of the operator to determine whether the operator looked at the visual notification. In some embodiments, analysis of the display and of the operator are utilized in conjunction with one another to verify generation and/or receipt of the visual notification.

Figure 5:
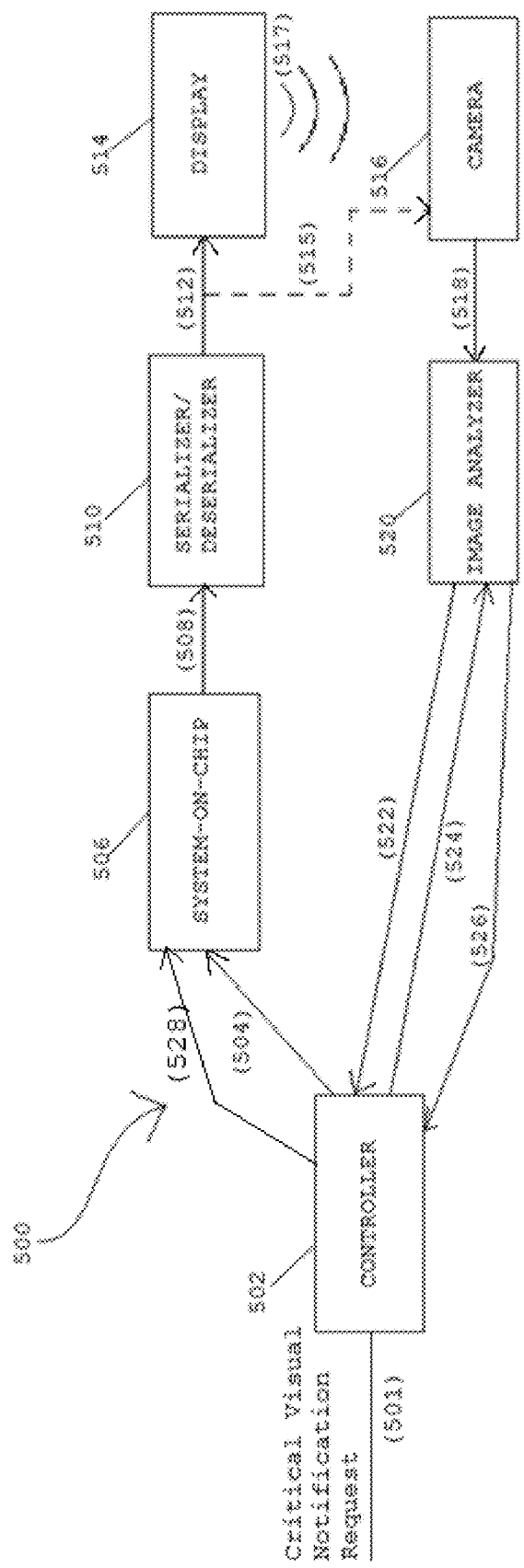
FIG. 5 is a block diagram illustrating generation and monitoring of visual notifications according to some embodiments.

Referring to FIG. 5, a block diagram of the visual notification generation path, including controller 502, system-on-chip (SoC) 506, serializer/deserializer 510, and display 514 is illustrated, along with a block diagram of the external visual notification verification system, which includes one or more cameras 516 and image analyzer 520.

Similar to that discussed in FIG. 2 with respect to the chime generation path, the visual notification generation path includes a controller 502 configured to receive visual notification requests 501. In response to the visual notification request, controller 502 generates a visual request that is provided to the SoC 506. In some embodiments, controller 502 may also generate an expected visual notification 524 provided to the external visual notification verification system—specifically to image analyzer 520—alerting the visual monitoring system of the visual notification to be generated. SoC 506 processes the request for a particular visual notification to be displayed and acts to add the visual notification to the overall display. In some embodiments, if the visual notification is simply lighting a lamp/LED on the dash (e.g., check engine light), then SoC 506 may simply provide the instruction to light the particular lamp/LED. However, in many cases the display 514 is a digital screen capable of displaying images. In some embodiments, SoC 506 may incorporate a plurality of images—including visual notifications—into a composite image to be displayed by the display 514. Based on the output 508 provided by the SoC 506, serializer/deserializer 510 converts the composite image to the input required by display 514.

In some embodiments, camera 516 is oriented to monitor the display 514. In other embodiments, the video signal 512 is bifurcated into first and second video signals. The first video signal 512 is sent to the display and the second video signal 515 is provided as an input to camera 516 (or some other device capable of receiving a video input). In some embodiments, relying solely on the second video signal 515 for verification of visual notifications will not capture faults residing on the display 514 (e.g., missing pixels, poor brightness, etc.) that may result in the visual notification—even if correctly generated by the SoC 506 and serializer/deserializer 510—failing to communicate information to the operator. In some embodiments, both videos/images captured by camera 516 and the second video input 515 provided to camera 516 may be analyzed to verify generation of the visual notification and/or to determine the source of the fault if one is detected.

Monitored images/video 518—either captured by camera 516 and/or received via second video input 515—are provided to image analyzer 520. In some embodiments, image analyzer 520 analyzes all received images for detection of one or more visual notifications. For example, image analyzer 520 may maintain a library of visual notifications and may continuously monitor the recorded image/video 518 to determine whether any of the library of visual notifications is detected within the recorded images/video 518. In response to a detected visual notification, image analyzer 520 provides feedback 522 to the controller 502 identifying the visual notification detected. In other embodiments, in response to an expected visual notification 524, image analyzer 520 analyzes captured images/video 518 to verify whether the visual notification was properly displayed by display 514. In some embodiments, verifying a visual notification in response to an expected visual notification communication alleviates requirements that the image analyzer 520 continuously analyze captured images/video 518 to detect visual notifications. A variety of algorithms may be utilized to detect visual notifications. In some embodiments, image analyzer 520 utilizes a visual pattern matching algorithm via neural networks to identify known visual notifications. In other embodiments, image analyzer 520 may utilize a digital signal processor (DSP) image correlation algorithm.

In some embodiments, in addition to verifying generation of a visual notification, feedback 522 may include one or more parameters associated with the visual notification. For example, in some embodiments image analyzer 520 may also provide feedback regarding brightness of the visual notification, brightness as compared with the ambient lighting conditions, contrast of the visual display as compared with the background of the display, bad graphics panel (e.g., dead pixels), etc.

In some embodiments, either in conjunction with monitoring of the display or in lieu of monitoring the display, camera 516 may be oriented to monitor the operator of the vehicle to detect whether a visual notification was received by the operator. In some embodiments, controller 502 communicates an expected visual notification 524 to the external visual notification system. In response, image analyzer 520 begins analyzing images and/or video 518 provided by camera 516 to verify operator reaction to the provided visual notification. For example, in some embodiments image analyzer 520 utilizes gaze or attention tracking to verify that the operator looked in the direction of the generated visual notification for a sufficiently long period of time. In some embodiments, image analyzer 520 utilizes gaze or attention tracking to verify that the operator responded to the notification provided by looking in the direction required by the alert. For example, if the visual notification is a rear object detected alert, then the operator's gaze should be directed to a rearview mirror and/or backup camera display for a sufficient period of time. In some embodiments, either alone or in combination with gaze or attention tracking, image analyzer 520 may monitor visual biometric parameters associated with the operator to detect a change in status in response to the visual notification. For example, in some embodiments image analyzer 520 may monitor eye reaction or facial movements to determine whether the operator received the visual notification. In other embodiments, additional sensors (not shown) may be utilized to collect biometric data associated with the operator. Biometric data may include heart rate, blood pressure, and/or movement of the operator. These biometric parameters may be analyzed alone or in combination with video/image to verify operator receipt of the visual notification. The result of the analysis is provided to the visual notification generation path (e.g., controller 502) and may be utilized in conjunction with other feedback to determine whether the visual notification was properly generated and/or received by the operator.

Based on the received feedback, controller 502 may take steps to mitigate a failure to generate the visual notification or failure to generate a visual notification likely to be seen by the operator. The steps taken by controller 502 may depend on whether the visual notification was verified but monitored parameters indicate that it was likely not received or detected by the operator, or whether the visual notification generation path failed to generate the visual notification entirely. For example, if the visual notification was not generated, that indicates a vault in the visual notification generation path. In some embodiments, controller 502 may react by deciding to deliver the notification via an alternative notification path (e.g., audio generation path). If the visual notification was generated, but one or more parameters indicate—that it is likely that the operator did not receive the notification, then the controller 502 may request generation of a second visual notification wherein one or more parameters of the visual notification are modified to improve the likelihood the visual notification is received. This may include modifying the location at which the visual notification is generated, modifying the brightness of the backlighting, and/or contrast between the visual notification and the background, changing the background/brightness/coloring/opacity/animation/placement or other aspects of the visual display notification itself, or sending a different visual notification.

In some embodiments, the independent external visual monitoring system may also be utilized to monitor ambient conditions within the cabin and provide the controller 502 with feedback regarding the ambient conditions prior to generation of the visual notification. Controller 502 may utilize the monitored ambient conditions to modify one or more parameters associated with the visual notification being generated. Parameters monitored to determine ambient conditions may include brightness (e.g., daytime, nighttime), ratio of brightness of the screen as compared with the interior of cabin, obscuration warnings with respect to the display, and/or other parameters associated with conditions within the cabin and/or conditions associated with the display. Based on these parameters, controller 502 may modify the visual notification generated.

Figure 6:
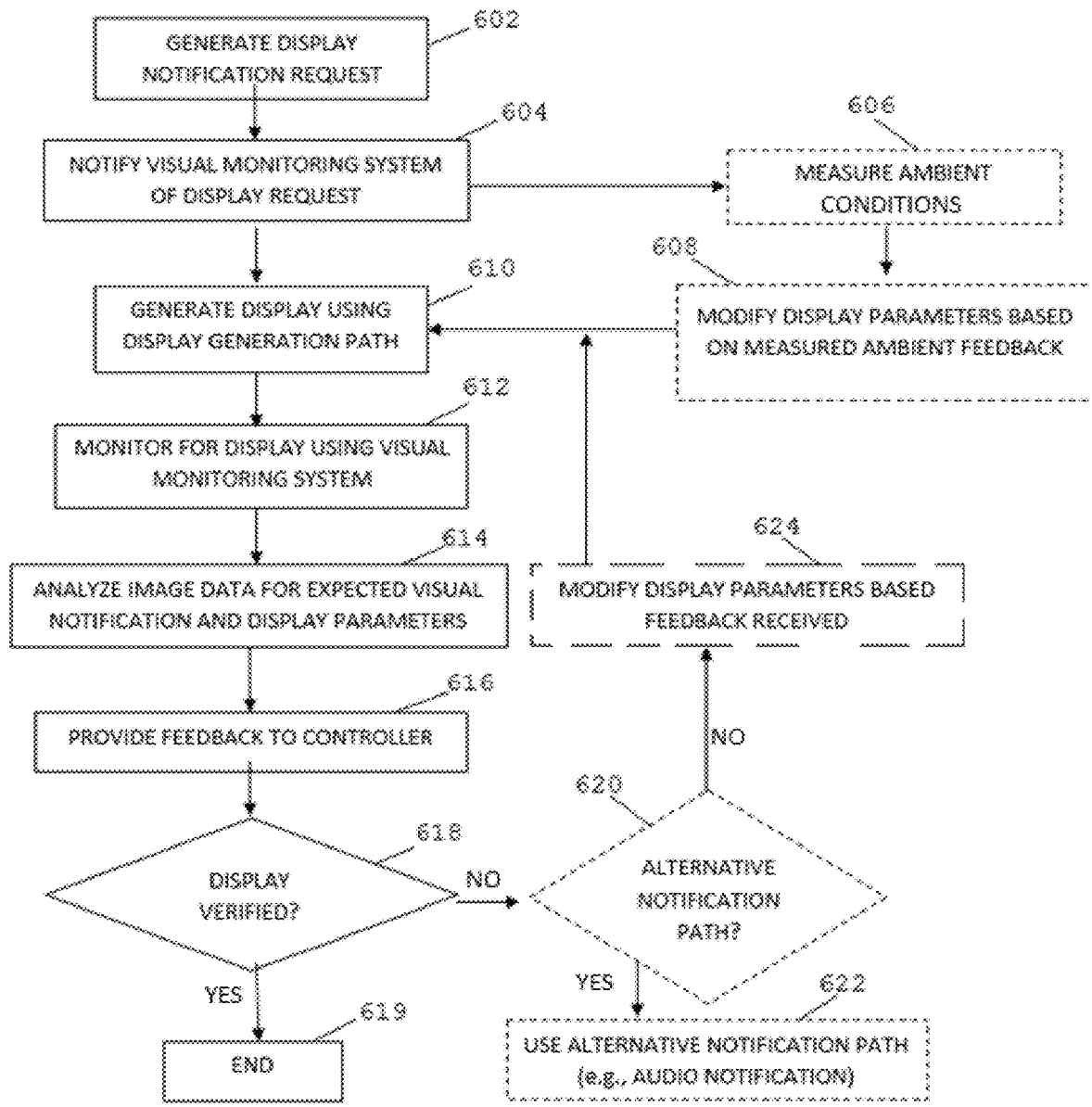
FIG. 6 is a flowchart illustrating verification of visual notifications according to some embodiments.

FIG. 6 is a flowchart illustrating verification of visual display notifications according to some embodiment. In the embodiment shown in FIG. 6, at least some of the boxes indicating steps performed are shown with dashed lines to indicate that these steps may be optionally performed in some embodiments.

At step 602, a display notification request is generated. As described in FIG. 5, the display notification request may be generated by controller 502. In some embodiments, at step 604 the independent visual monitoring system is notified of the visual display notification request. As described with respect to FIG. 5, controller 502 may provide the independent monitoring system (e.g., image analyzer 520) with the display notification request, which may include identification of the visual notification to be generated.

In some embodiments, at step 606 the independent visual monitoring system (e.g., camera 516 and image analyzer 520 shown in FIG. 5) records image and/or video data from within the cabin and utilizes the recorded data to determine ambient visual conditions within the cabin (e.g., brightness, obscuration of display, etc.). Ambient visual conditions are provided in feedback to the visual notification path (e.g., controller 502 shown in FIG. 5). At step 608 the controller 502 may selectively modify one or more aspects of the visual notification generated based on the ambient visual conditions feedback received. For example, this may include modifying backlighting associated with the display (e.g., increased in response to bright ambient conditions), moving the location of the visual notification to an unobscured display surface, modifying the background/brightness/coloring/opacity/animation/placement or other aspects of the visual display notification itself, or other steps to increase the likelihood that the visual notification is seen by the operator. The purpose of providing initial feedback to the visual notification generation path is to increase the likelihood that the first visual notification is generated and received (i.e., noticed) by the operator, without having to generate a second visual notification to mitigate the failure of the first visual notification to be seen by the operator.

At step 610, the visual notification is generated using the visual notification generation path, which as discussed in FIG. 5 may include a SoC 506, serializer/deserializer 510, and/or display 514. In embodiments in which pre-measuring ambient conditions is provided at steps 606 and 608, then generating the visual notification may include modifying one or more parameters associated with the visual notification generation path (e.g., display backlighting brightness, notification location, notification aspects, etc.) to ensure delivery of the notification to the operator.

At step 612, the independent visual monitoring path records images and/or video data to verify delivery of the visual notification. In some embodiments, this includes monitoring images/video data focused on the display delivering the visual notifications. In other embodiments this may include monitoring image/video data focused on the operator of the vehicle to determine whether the operator noticed/received the visual notification. In some embodiments, one or more cameras may be utilized to monitor multiple display locations and/or operator response.

At step 614, image/video data monitored at step 612 (e.g., by camera 516, shown in FIG. 5) is analyzed to verify generation of the expected visual notification and/or receipt of the visual notification by the operator. In some embodiments, a plurality of algorithms may be utilized to recognize/correlate an expected visual notification with monitored image/video data, including utilization of image recognition using neural networks, image correlation using DSP, and/or image recognition using artificial intelligence. For example, a neural network utilizes training data to identify visual notifications presented on a display. In this way, a particular visual notification can be identified within a composite image. In some embodiments, the output provided by the recognition algorithm indicates whether the visual notification has been detected. This may be a binary yes/no output, or it may include a numerical confidence level associated with the determination. In some embodiments, in addition to a verification of whether the visual notification was properly generated, one or more parameters is measured that corresponds with the visual notification. For example, in some embodiments this may include monitoring brightness of the visual notification generation, contrast of the visual notification as compared with the background, identification of faults (e.g., missing pixels) in the visual notification, and/or other parameters associated with the visual notification.

In other embodiments, image/video data monitors the operator's reaction to a visual notification and is analyzed at step 614 to determine whether the operator was made aware of the visual notification. In this type of analysis, the visual notification itself is not detected; rather the operator's reaction to the visual notification is monitored to determine whether the operator received the notification. In some embodiments, this may include gaze analysis to determine whether the operator has looked at the region in which the visual notification was generated for a sufficiently long period of time. In some embodiments, gaze analysis may be utilized to determine if the operator looked in the direction indicated by the alert. For example, a visual notification indication that a rear object has been detected while the car is backing up should result in the operator looking at the rear-view mirror and/or the display for the rear camera. If the driver does not look at either of these, this is an indication that the visual notification was not received by the operator.

At step 616, the results of the analysis is provided in feedback to the visual notification generation path (e.g., controller 502 shown in FIG. 5). In some embodiments, feedback includes verification the visual notification was generated. In other embodiments, feedback includes measured parameters associated with the visual notification (e.g., brightness, contrast with background, obscuring of the visual notification, missing pixels, etc.). In other embodiments, feedback may include verification that the operator looked at the visual notification.

At step 618, a determination is made whether the visual notification generated satisfied the notification requirements. For example, in some embodiments if the visual notification was verified, then the requirement has been satisfied and the process ends at step 619. In other embodiments, the determination at step 618 determines whether the visual notification provided sufficient notification to the operator. In some embodiments, this determination may additionally be based on measured parameters associated with the visual notification (e.g., brightness, contrast with the background, obscuring of the visual notification, missing pixels, etc.). For example, the independent visual monitoring system may detect the presence of the visual notification, but due to an object obscuring at least a portion of the visual notification it may be determined that the visual notification was insufficiently visible to provide notice to the operator. Similarly, the independent visual monitoring system may detect the presence of the visual notification, but analysis of the operator may determine that the operator did not look in the direction of the visual notification and therefore likely did not receive the notification. In some embodiments, in addition to inputs received from the independent visual monitoring system with respect to either verification of the visual notification and/or verification that the operator looked at the visual notification, in some embodiments the actions of the operator may also be utilized to determine whether the visual notification was received by the operator. For example, if the visual notification indicates that an object was detected behind the vehicle while the vehicle is backing up and the operator has not engaged the brakes, this indicates that the operator did not receive the visual notification. Each of these feedbacks may be utilized in combination with one another to determine whether the visual notification was properly generated and/or received by the operator.

If, at step 618 it is determined that the visual notification was not generated, or one or more of the measured parameters or external inputs indicates that the visual notification was not received, then at step 620 a determination is made whether the notification should be provided via an alternative notification path (e.g., audio notification). For example, if the brightness of the visual display is already operating at a maximum brightness, or if no alternative display is available for displaying the visual notification, then at step 622 the notification is provided via an alternative path (e.g., audio notification). A benefit of this approach is that the notification is not confined to a single generation path and may be modified during operation to overcome conditions outside of the control of the initial generation path. For example, visual notifications—even if the visual generation path is working properly—may not be visible as a result of the operator obscuring the display with an object. In this embodiment, an alternative notification path may be utilized to deliver the notification (e.g., an audio notification).

If an alternative notification path is not utilized at step 620 then at step 624 one or more parameters of the visual notification are modified based on the received feedback and a new visual notification is generated at step 610. For example, in some embodiments visual notification parameters modified include the backlighting/brightness of the visual notification. In other embodiments, the visual notification may be generated at an alternative display or screen. In still other embodiments, the visual notification itself may be changed such as its background/brightness/coloring/opacity/animation/placement or other aspects. Based on the modified parameters/instructions, at step 610 the new visual notification is generated, and the process continues until the generated notification satisfies the independent visual monitoring system and/or an alternative notification path is utilized.

Discussion of Possible Embodiments

The following are non-exclusive descriptions of possible embodiments of the present invention.

According to some aspects, a method of verifying audio notifications generated within a vehicle is provided. The method may include generating an audio notification using an audio generation path that includes at least a controller, an audio notification generator and a speaker. The controller may generate an audio notification request utilized by the audio notification generator to generate an audio signal, wherein the speaker may then convert the audio signal into the audio notification. The method may further include monitoring sounds within the vehicle using a microphone separate from the audio generation path and analyzing the sounds monitored by the microphone using an audio analyzer, wherein the audio analyzer verifies whether the audio notification was generated. Feedback may be provided to the audio generation path regarding whether generation of the audio notification was verified.

The method of the preceding paragraph can optionally include, additionally and/or alternatively any, one or more of the following features, configurations and/or additional components.

For example, analyzing the sounds within the vehicle may include measuring one or more parameters of the audio notification.

In some embodiments, the one or more parameters of the audio notification measured include an amplitude of ambient noise and a signal-to-noise ratio (SNR) of the audio notification.

In some embodiments, providing feedback to the audio generation path may further include providing one or more of the measured parameters in feedback to the audio generation path.

In some embodiments, the method may include amplifying the audio signal generated by the audio notification generator using an amplifier included as part of the audio generation path, wherein the speaker converts the amplified audio signal to the audio notification.

In some embodiments, the controller may selectively increase/decrease the amplification provided by the amplifier based on feedback provided to the generation path regarding verification of the audio notification.

In some embodiments, the method may include providing a notification to the audio analyzer of the audio notification request generated by the controller, wherein the audio analyzer analyzes sounds monitored by the microphone for a period of time following the audio notification request.

In some embodiments, the method may further include measuring ambient sound levels using the microphone and audio analyzer prior to generation of an audio notification, providing feedback to the controller regarding the measured ambient noise levels, and selectively increasing/decreasing the amplification provided by the amplifier based on the measured ambient noise levels.

In some embodiments, the method may further include generating an alternative notification in response to feedback indicating failure to generate the audio notification.

In some embodiments, the alternative notification may be an audio notification generated at an alternative speaker.

In some embodiments, the alternative notification may be a visual indicator displayed to an operator.

According to another aspect, an audio notification system may include an audio notification generation path and an external audio verification system. The notification generation path may include at least a controller, an audio notification generator, and a speaker, wherein the controller may generate an audio notification request and the audio generator may in response generate an audio notification signal. The speaker may then convert the audio notification signal into an audio output provided as an audio notification to an operator of the vehicle. The external audio verification system may include at least a microphone and an audio analyzer, wherein the microphone may monitor audio signals within an interior cabin of the vehicle and the audio analyzer may analyze monitored audio signals to verify whether the audio notification requested by the controller was properly generated. Verification may be provided as feedback to the audio notification generation path.

The audio notification system of the preceding paragraph can optionally include, additionally and/or alternatively any, one or more of the following features, configurations and/or additional components.

For example, the microphone may be utilized to provide hands free calling and voice recognition.

In some embodiments, the audio analyzer may correlate the monitored audio signals with one or more possible audio notifications to verify generation of the audio notification.

In some embodiments, the controller may provide an expected audio notification signal identifying an audio notification to be generated to the external audio verification system to notify the audio analyzer to begin analyzing the monitored audio signals for the identified audio notification.

In some embodiments, the microphone and the audio analyzer may monitor ambient noise levels and provide an ambient noise level feedback to the audio notification generation path.

In some embodiments, the audio notification generation path may utilize the ambient noise levels to selectively modify a volume of the audio notification generated.

In some embodiments the audio notification system may further include a visual display configured to display visual notifications, wherein the audio notification generation path may generate a visual notification in response to feedback indicating a failure to generate the audio notification.

According to another aspect, a method of verifying audio notifications generated within a vehicle may include receiving feedback from an external audio monitoring system that includes a microphone and an audio signal analyzer regarding ambient sound levels measured within an interior cabin of a vehicle. An audio notification may be generated using an audio generation path that may includes at least a controller, an audio notification generator, an amplifier and a speaker, wherein the controller may generate an audio notification request utilized by the audio notification generator to generate an audio notification signal based on the ambient sound levels measured by the external audio monitoring system. The speaker may convert the audio notification signal into the audio notification. The method may further include monitoring sounds within the vehicle using a microphone separate from the audio generation path and analyzing the sounds monitored by the microphone using an audio analyzer, wherein the audio analyzer verifies whether the audio notification was generated. Feedback may be provided to the audio generation path regarding whether generation of the audio notification was verified.

The method of the preceding paragraph can optionally include, additionally and/or alternatively any, one or more of the following features, configurations and/or additional components.

For example, the method may further include generating a visual notification using a visual generation path in response to feedback indicating that the audio notification was not verified.

The invention claimed is:

1. A method of verifying audio notifications generated within a vehicle, the method comprising:
generating an audio notification using an audio generation path that includes at least a controller, an audio notification generator and a speaker, wherein the controller generates an audio notification request utilized by the audio notification generator to generate an audio signal, and wherein the speaker converts the audio signal into the audio notification;
providing a notification to an audio analyzer of the audio notification request generated by the controller;
monitoring sounds within the vehicle using a microphone separate from the audio generation path;
analyzing the sounds monitored by the microphone using the audio analyzer, wherein the audio analyzer analyzes sounds monitored by the microphone for a period of time following the audio notification request and verifies whether the audio notification was generated during the monitored period of time; and
providing feedback to the audio generation path regarding whether generation of the audio notification was verified.

2. The method of claim 1, wherein analyzing the sounds within the vehicle includes measuring one or more parameters of the audio notification.

3. The method of claim 2, wherein the one or more parameters of the audio notification measured include an amplitude of ambient noise and a signal-to-noise ratio (SNR) of the audio notification.

4. The method of claim 2, wherein providing feedback to the audio generation path includes providing one or more of the measured parameters in feedback to the audio generation path.

5. The method of claim 2, further including:
amplifying the audio signal generated by the audio notification generator using an amplifier included as part of the audio generation path, wherein the speaker converts the amplified audio signal to the audio notification.

6. The method of claim 5, wherein the controller selectively increases/decreases the amplification provided by the amplifier based on feedback provided to the generation path regarding verification of the audio notification.

7. The method of claim 1, wherein the notification provided to the audio analyzer identifies a type of audio notification requested, wherein analyzing the sounds monitored by the microphone using the audio analyzer includes correlating the type of audio notification requested with the sounds monitored by the microphone to detect the audio notification requested by the controller.

8. The method of claim 7, further including:
measuring ambient sound levels using the microphone and audio analyzer prior to generation of an audio notification;
providing feedback to the controller regarding the measured ambient noise levels; and
selectively increasing/decreasing the amplification provided by the amplifier based on the measured ambient noise levels.

9. The method of claim 1, further including:
generating an alternative notification in response to feedback indicating failure to generate the audio notification.

10. The method of claim 9, wherein the alternative notification is an audio notification generated at an alternative speaker.

11. The method of claim 9, wherein the alternative notification is a visual indicator displayed to an operator.

12. An audio notification system for use in vehicles, the system comprising:
an audio notification generation path that includes at least a controller, an audio notification generator, and a speaker, wherein the controller generates an
audio notification request, the audio generator generates an audio notification signal in response to the audio notification request, and the speaker converts the audio notification signal into an audio output provided as an audio notification to an operator of the vehicle; and
an external audio verification system that includes at least a microphone and an audio analyzer, wherein the microphone monitors/senses audio signals within an interior cabin of the vehicle and the audio analyzer analyzes monitored audio signals to verify whether the audio notification requested by the controller was properly generated, wherein verification is provided as feedback to the audio notification generation path, wherein the controller provides an expected audio notification signal identifying an audio notification to be generated to the external audio verification system to notify the audio analyzer to begin analyzing the monitored audio signals for the identified audio notification.

13. The audio notification system of claim 12, wherein the microphone is utilized to provide hands free calling and voice recognition.

14. The audio notification system of claim 12, wherein the audio analyzer correlates the monitored audio signals with one or more possible audio notifications to verify generation of the audio notification.

15. The audio notification system of claim 12, wherein the expected audio notification signal provided to the external audio verification system identifies a type of audio notification requested, wherein analyzing the audio signals monitored by the microphone using the audio analyzer includes correlating the type of audio notification requested with the sounds monitored by the microphone to detect the audio notification requested by the controller.

16. The audio notification system of claim 12, wherein the microphone and the audio analyzer monitor ambient noise levels and provide an ambient noise level feedback to the audio notification generation path.

17. The audio notification system of claim 16, wherein the audio notification generation path utilizes the ambient noise level to selectively modify a volume of the audio notification generated.

18. The audio notification system of claim 12, further including:
 a visual display configured to display visual notifications, wherein the audio notification generation path generates a visual notification in response to feedback indicating a failure to generate the audio notification.

\* \* \* \* \*